(12) United States Patent
Lee et al.

(10) Patent No.: US 8,320,833 B2
(45) Date of Patent: Nov. 27, 2012

(54) TRANSMISSION APPARATUS, RECEPTION APPARATUS, TRANSMISSION SYSTEM WHICH COMBINES THESE, AND TRANSMISSION AND RECEPTION METHOD THEREOF

(75) Inventors: Sang-soo Lee, Seoul (KR); Jong-tae Lim, Seoul (KR); Hyun-young Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 840 days.

(21) Appl. No.: 12/370,834

(22) Filed: Feb. 13, 2009

(65) Prior Publication Data
US 2009/0298435 A1    Dec. 3, 2009

(30) Foreign Application Priority Data
Jun. 3, 2008    (KR) .................... 10-2008-0052090

(51) Int. Cl.
*H04B 15/00* (2006.01)
(52) U.S. Cl. ............................................. 455/63.1

(58) Field of Classification Search ............... 455/63.1, 455/67.11, 66.1, 552.1, 161.3, 179.1, 296, 455/133–135, 277.1, 277.2
See application file for complete search history.

(56) References Cited

U.S. PATENT DOCUMENTS

| | | | |
|---|---|---|---|
| 7,693,544 B2 * | 4/2010 | Segev et al. | 455/553.1 |
| 7,860,527 B2 * | 12/2010 | Ngai et al. | 455/552.1 |
| 7,925,297 B2 * | 4/2011 | Zhu et al. | 455/553.1 |
| 8,023,916 B2 * | 9/2011 | Oe | 455/278.1 |

* cited by examiner

*Primary Examiner* — Khanh V Nguyen
(74) *Attorney, Agent, or Firm* — Sughrue Mion, PLLC

(57) ABSTRACT

A transmission apparatus, a reception apparatus, a transmission system which combines these, and a transmission and reception method thereof are provided. The transmission apparatus includes a first transmission unit which transmits data via a channel in a first band, a second transmission unit which transmits data via a channel in a second band, and a transmission control unit which controls the first transmission unit to stop transmitting the data via the channel in the first band if interference is sensed in the channel in the first band. Accordingly, data can be provided without data interruption in a wireless environment where there is interference.

12 Claims, 7 Drawing Sheets

|  |  | FCC | ETSI |
|---|---|---|---|
| 5GHz | FREQUENCY BAND | 5.15~5.25 GHz<br>5.25~5.35 GHz<br>5.47~5.725 GHz<br>5.725~5.825 GHz | 5.15~5.25 GHz<br>5.25~5.35 GHz<br>5.47~5.725 GHz |
| 5GHz | CENTER FREQUENCY OF EACH CHANNEL | 5180MHz, 5200MHz, 5220MHz<br>5240MHz, 5260MHz, 5280MHz<br>5300MHz, 5320MHz, 5500MHz<br>5520MHz, 5540MHz, 5560MHz<br>5580MHz, 5600MHz, 5620MHz<br>5640MHz, 5660MHz, 5680MHz<br>5700MHz, 5745MHz, 5765MHz<br>5785MHz, 5805MHz, 5825MHz | 5180MHz, 5200MHz, 5220MHz<br>5240MHz, 5260MHz, 5280MHz<br>5300MHz, 5320MHz, 5500MHz<br>5520MHz, 5540MHz, 5560MHz<br>5580MHz, 5600MHz, 5620MHz<br>5640MHz, 5660MHz, 5680MHz<br>5700MHz |
| 2.4GHz | FREQUENCY BAND | 2.4~2.46 GHz | 2.4~2.47 GHz |
| 2.4GHz | CENTER FREQUENCY OF EACH CHANNEL | 2412MHz, 2417MHz, 2422MHz<br>2427MHz, 2432MHz, 2437MHz<br>2442MHz, 2447MHz, 2452MHz<br>2457MHz, 2462MHz | 2412MHz, 2417MHz, 2422MHz<br>2427MHz, 2432MHz, 2437MHz<br>2442MHz, 2447MHz, 2452MHz<br>2457MHz, 2462MHz, 2467MHz<br>2472MHz |

TRANSMISSION APPARATUS, RECEPTION APPARATUS, TRANSMISSION SYSTEM WHICH COMBINES THESE, AND TRANSMISSION AND RECEPTION METHOD THEREOF

CROSS-REFERENCE TO RELATED APPLICATIONS

This application claims priority from Korean Patent Application No. 10-2008-0052090, filed on Jun. 3, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to a transmission apparatus, a reception apparatus, a transmission system which combines these, and a transmission and reception method thereof, and more particularly, to a transmission apparatus, a reception apparatus, a transmission system combining these which can transmit and receive data without data interruptions in a wireless environment in which interference exists, and a transmission and reception method thereof.

2. Description of the Related Art

In general, a wireless environment provides greater convenience than a cable environment since installation and movement in the wireless environment are easy and space restrictions are less severe. However, since there are diverse forms of wave interferences in a wireless environment, the transmission quality of each channel may fluidly change according to the presence or absence of interference and the strength or weakness of the interference.

Interference generally occurs due to conflicts with other devices which use the same frequency band, and also may occur due to regulation standards such as Dynamic Frequency Selection (DFS) which allocates use permission by radar according to priority. In the latter case, not only does the transmission quality deteriorate, but a channel used to transmit data must also be emptied.

When radar interference occurs while a user is receiving data, the data cannot be continuously provided to the user. Such a problem increases when the data are image data, audio data, or broadcast data to be transmitted in real time.

Therefore, there is a need for methods to provide the user with data without data interruptions when interference occurs due to conflicts between devices or regulation standards.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention provides a transmission apparatus, a reception apparatus, a transmission system combining these which can transmit and receive data without data interruptions when interference occurs while transmitting data in a wireless environment, and a transmission and reception method thereof.

According to an exemplary aspect of the present invention, there is provided a transmission apparatus including a first transmission unit which transmits data via a channel in a first band, a second transmission unit which transmits data via a channel in a second band, and a transmission control unit which controls the first transmission unit to stop transmitting the data via the channel in the first band if interference is sensed in the channel in the first band.

The transmission control unit may determine whether there is any available channel in the first band after stopping transmission of the data via the channel in the first band, and control the first transmission unit to start transmitting the data via the available channel if there is any available channel in the first band.

The first band may be a frequency band in accordance with the IEEE 802.11n standard, and the second band may be a frequency band in accordance with the IEEE 802.11g standard.

The interference may be interference by radar as defined by the Dynamic Frequency Selection (DFS) regulation standard.

The transmission control unit may control the second transmission unit to keep transmitting the data via the channel in the second band even if interference is sensed in the channel in the second band.

According to an exemplary aspect of the present invention, there is provided a reception apparatus including a first reception unit which receives data via a channel in a first band, a second reception unit which receives data via a channel in a second band, and a reception control unit which determines whether interference is sensed and thereby controls selection of one of the data received via the channel in the first band and the data received via the channel in the second band.

The reception control unit may control selection of the data received via the channel in the first band if interference is not sensed in the channel in the first band, and the reception control unit may control selection of the data received via the channel in the second band if interference is sensed in the channel in the first band.

If the reception control unit determines that data are received via a channel in the first band where interference is not sensed while selecting the data received via the channel in the second band, the reception control unit may control selection of the data received via the channel in the first band where the interference is not sensed.

If the data are not received through one of the first reception unit and the second reception unit, the reception control unit may control selection of the data received through the other one of the first reception unit and the second reception unit.

The reception control unit may control selection of the data received via the channel in the second band, if interference is sensed in the channel in the first band, regardless of whether interference is sensed in the channel in the second band.

According to an exemplary aspect of the present invention, there is provided a transmission system including a transmission apparatus which transmits data via a plurality of bands, and a reception apparatus which sets and selects data received via a 5 GHz band from among the plurality of bands to be default data.

The reception apparatus may select data received via another band if there is interference in the 5 GHz band.

The transmission apparatus may be a broadcast transmission apparatus which receives a broadcast signal and wirelessly transmits data regarding the broadcast signal to the reception apparatus, and the reception apparatus may be a broadcast output apparatus which outputs a broadcast using the data regarding the broadcast signal wirelessly received from the transmission apparatus.

According to an exemplary aspect of the present invention, there is provided a transmission method including transmitting data via a channel in a first band, transmitting data via a channel in a second band, and stopping transmitting the data via the channel in the first band if interference is sensed in the channel in the first band.

The transmission method may further include determining whether there is any available channel in the first band after stopping transmission of the data via the channel in the first band, and starting transmitting the data via the available channel in the first band if there is any available channel in the first band.

The first band may be a frequency band in accordance with the IEEE 802.11n standard, and the second band may be a frequency band in accordance with the IEEE 802.11g standard.

The interference may be interference by radar as defined by the Dynamic Frequency Selection (DFS) regulation standard.

In transmitting data via the channel in the second band, the data may keep being transmitted via the channel in the second band even if interference is sensed in the channel in the second band.

According to an exemplary aspect of the present invention, there is provided a reception method including receiving data via a channel in a first band, receiving data via a channel in a second band, and determining whether interference is sensed and thereby selecting one of the data received via the channel in the first band and the data received via the channel in the second band.

In the selecting operation, the data received via the channel in the first band may be selected if interference is not sensed in the channel in the first band, and the data received via the channel in the second band may be selected if interference is sensed in the channel in the first band.

In the selecting operation, if data are received via a channel in the first band where interference is not sensed, after selecting the data received via the channel in the second band, the data received via the channel in the first band where the interference is not sensed may be selected.

In the selecting operation, if the data are not received through one of the channel in the first band and the channel in the second band, the data received through the other one of the channel in the first band and the channel in the second band may be selected.

In the selecting operation, the data received via the channel in the second band may be selected, if interference is sensed in the channel in the first band, regardless of whether interference is sensed in the channel in the second band.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

Figure 1:
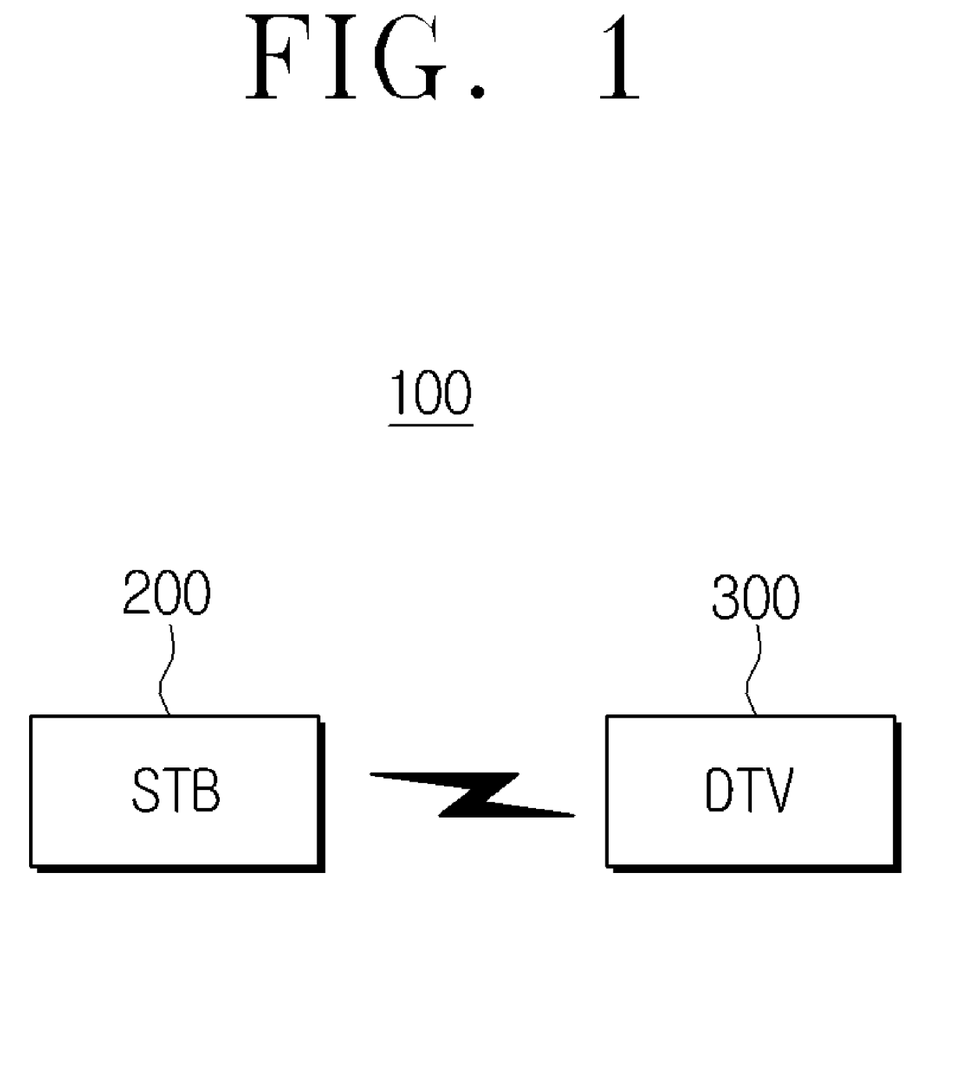
FIG. 1 illustrates a transmission system for wireless data transmission according to an exemplary embodiment of the present invention.

FIG. 1 illustrates a transmission system 100 for wireless data transmission according to an exemplary embodiment of the present invention. The transmission system 100 receives broadcasts from a broadcast station and provides viewers with the broadcasts. As illustrated in FIG. 1, the transmission system 100 includes a set-top box (STB) 200 and a digital television (DTV) 300.

The STB 200 is a kind of a broadcast reception apparatus that receives broadcasts from a broadcast station wirelessly or using a cable. The STB 200 tunes to, demodulates, and decodes a broadcast received from the broadcast station, and transmits it wirelessly to the DTV 300.

The DTV 300 is a kind of a broadcast output apparatus that receives broadcasts from the STB 200 wirelessly and outputs them. The DTV 300 processes signals of a broadcast wirelessly received from the STB 200 so that video and audio can be provided to viewers.

Figure 2:
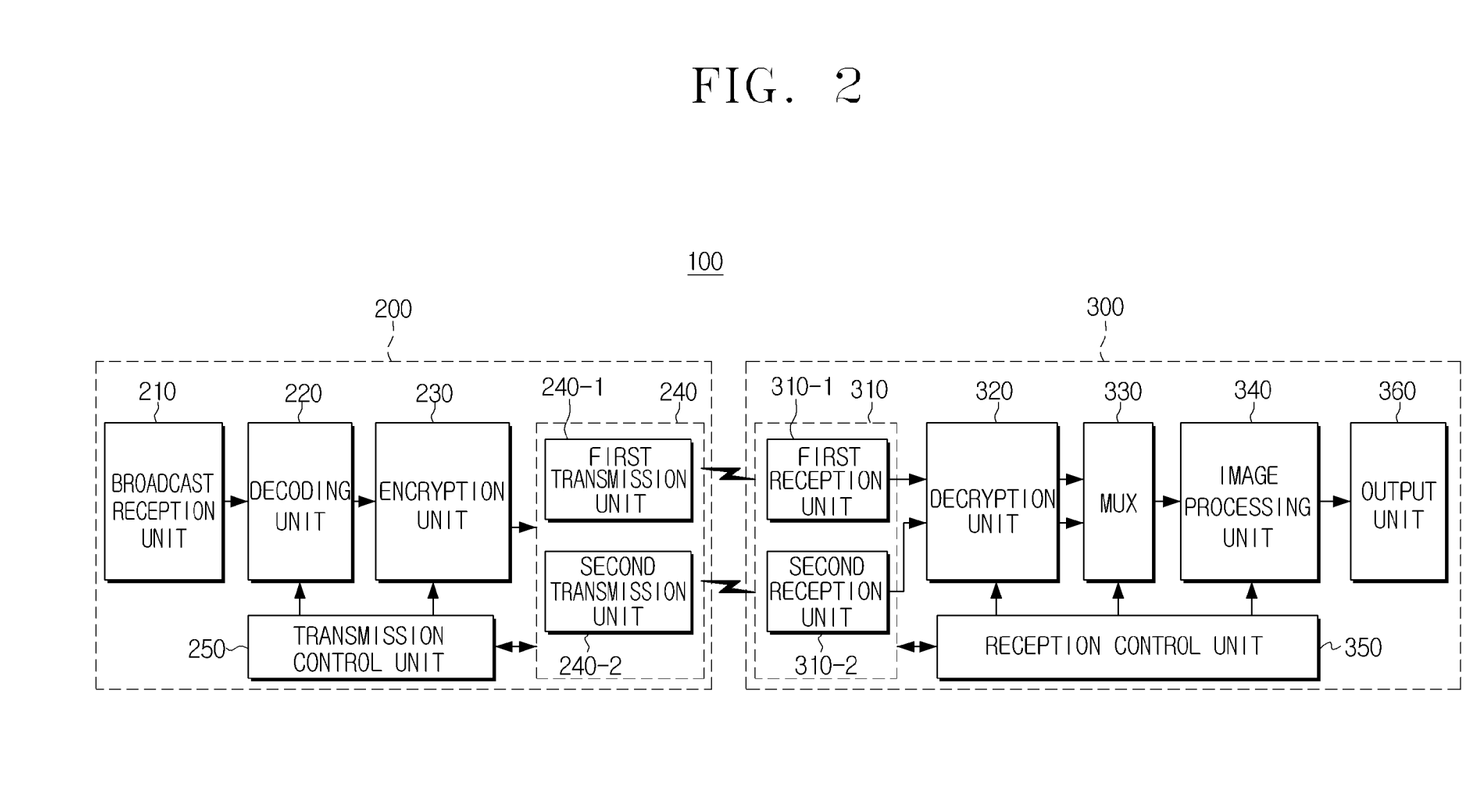
FIG. 2 is a detailed block diagram illustrating the transmission system according to the exemplary embodiment of the present invention.

FIG. 2 is a detailed block diagram illustrating the transmission system 100 according to the exemplary embodiment of the present invention.

As illustrated in FIG. 2, the STB 200 includes a broadcast reception unit 210, a decoding unit 220, an encryption unit 230, a transmission unit 240, and a transmission control unit 250.

The broadcast reception unit 210 tunes to one of broadcasts received wirelessly and broadcasts received via a cable, demodulates the tuned broadcast, and outputs the demodulated broadcast to the decoding unit 220.

The decoding unit 220 decodes a broadcast signal received from the broadcast reception unit 210, and outputs the decoded broadcast signal to the encryption unit 230.

The encryption unit 230 encrypts the decoded broadcast signal so as to prevent illegal copying of a broadcast which may occur while wirelessly transmitting the broadcast. That is, when the STB 200 wirelessly transmits a broadcast to the DTV 300, unauthorized viewers or third parties may extract and view the broadcast. In order to prevent such a problem, the encryption unit 230 encrypts the broadcast and transmits it to the transmission unit 240. Such an operation of the encryption unit 230 is controlled by the transmission control unit 250. Such an encryption may be copy protection (CP) encryption.

The transmission unit 240 wirelessly transmits the encrypted broadcast to the DTV 300 using channels in a plurality of frequency bands at the same time. In greater detail, the transmission unit 240 wirelessly transmits the encrypted broadcast via one of the channels in the 5 GHz band based on the IEEE 802.11n standard, and at the same time, via one of the channels in the 2.4 GHz band based on the IEEE 802.11g standard.

In order to wirelessly transmit the encrypted broadcast via two channels in different frequency bands, the transmission unit 240 may include a first transmission unit 240-1 and a second transmission unit 240-2.

The first transmission unit 240-1 wirelessly transmits the encrypted broadcast via one of the channels in the 5 GHz band based on the IEEE 802.11n standard.

The second transmission unit 240-2 wirelessly transmits the encrypted broadcast via one of the channels in the 2.4 GHz band based on the IEEE 802.11g standard.

Transmission in the 5 GHz band provides a higher image quality than transmission in the 2.4 GHz. The 5 GHz wireless local area network provides data rates faster than the 2.4 GHz wireless local area network. Accordingly, the users can wirelessly be provided with a high capacity of multimedia such as Internet broadcasts and games, and wirelessly view a TV with high definition (HD) quality. Consequently, if a broadcast is transmitted in the 2.4 GHz band, a standard definition (SD) quality of images are transmitted, and if a broadcast is transmitted in the 5 GHz band, an HD quality of images are transmitted.

That is, the first transmission unit 240-1 wirelessly transmits an HD quality of broadcast to the DTV 300, and the second transmission unit 240-2 wirelessly transmits an SD quality of broadcast, which is the same as that transmitted by the first transmission unit 240-1, to the DTV 300.

Hereinafter, channels via which an encrypted broadcast is wirelessly transmitted are described in detail with reference to FIG. 3.

Figure 3:
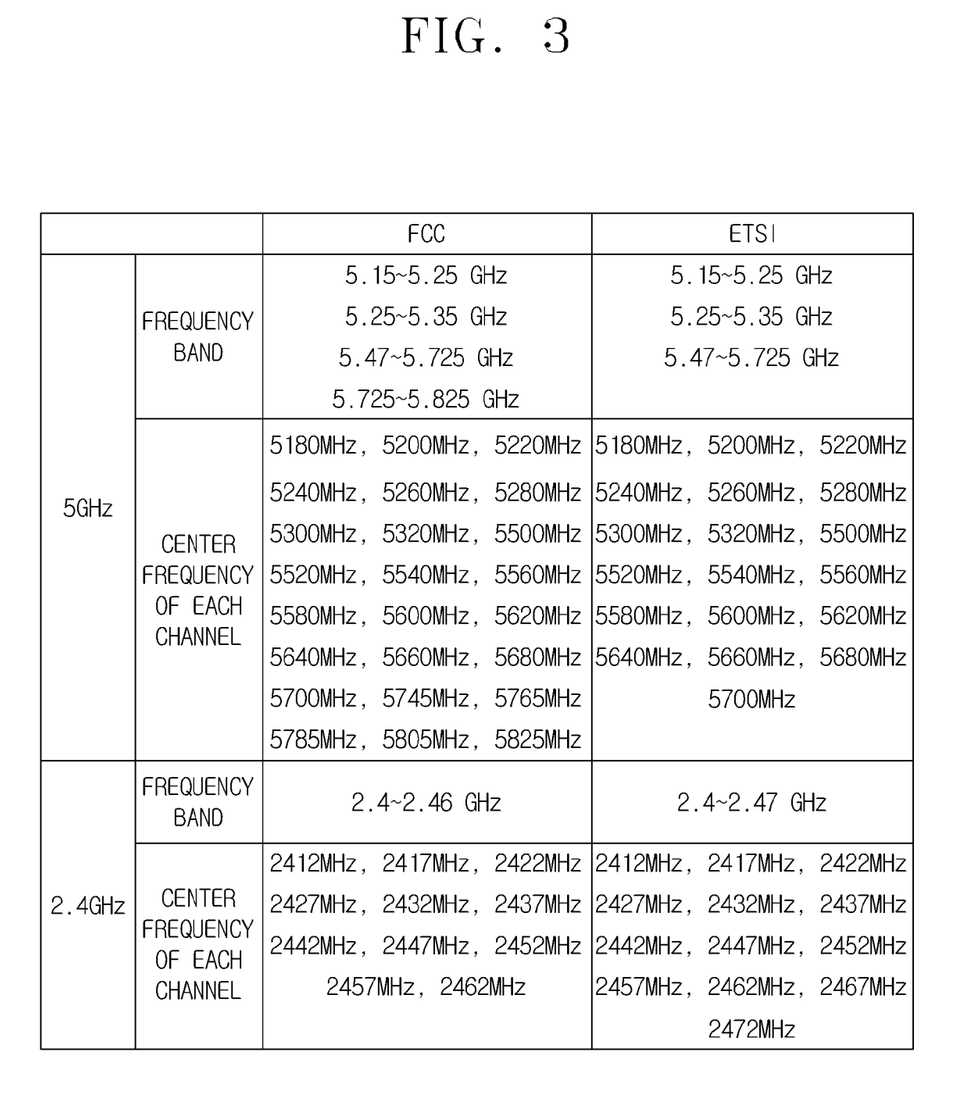
FIG. 3 illustrates center frequencies of channels in the 5 GHz band based on the IEEE 802.11n standard, and center frequencies of channels in the 2.4 GHz band based on the IEEE 802.11g standard.

FIG. 3 illustrates center frequencies of channels in the 5 GHz band based on the IEEE 802.11n standard, and center frequencies of channels in the 2.4 GHz band based on the IEEE 802.11g standard.

In FIG. 3, the frequency bands and center frequencies of channels are categorized according to regulation standards such as the Federal Communications Commission (FCC) and the European Telecommunications Standards Institute (ETRI). For convenience of description, a method for wirelessly transmitting an encrypted broadcast using the frequency bands and center frequencies of channels according to the FCC regulation is described.

The first transmission unit 240-1 transmits an encrypted broadcast to the DTV 300 via one of the channels having center frequencies of 5180 MHz, 5200 MHz, 5220 MHz, 5240 MHz, 5260 MHz, 5280 MHz, 5300 MHz, 5320 MHz, 5500 MHz, 5520 MHz, 5540 MHz, 5560 MHz, 5580 MHz, 5600 MHz, 5620 MHz, 5640 MHz, 5660 MHz, 5680 MHz, 5700 MHz, 5745 MHz, 5765 MHz, 5785 MHz, 5805 MHz, and 5825 MHz.

The second transmission unit 240-2 transmits the encrypted broadcast to the DTV 300 via one of the channels having center frequencies of 2412 MHz, 2417 MHz, 2422 MHz, 2427 MHz, 2432 MHz, 2437 MHz, 2442 MHz, 2447 MHz, 2452 MHz, 2457 MHz, and 2462 MHz.

The channels in the 5 GHz band can transmit broadcasts using channel bonding. Channel bonding is a technique by which data are transmitted using a combination of a plurality of channels so that the data transmission rate may be higher than data transmission using a single channel.

If a broadcast is transmitted using channel bonding, the first transmission unit 240-1 transmits the encrypted broadcast to the DTV 300 via a bonded channel having one of the center frequencies of 5190 MHz, 5230 MHz, 5270 MHz, 5310 MHz, 5510 MHz, 5550 MHz, 5590 MHz, 5630 MHz, 5670 MHz, 5755 MHz, 5795 MHz, and 5815 MHz. The bandwidth of the bonded channels is double the bandwidth of a non-bonded channel.

For example, if channels having center frequencies of 5260 MHz and 5280 MHz in the 5 GHz are available and a channel having a center frequency of 2417 MHz in the 2.4 GHz is available, the first transmission unit 240-1 transmits a broadcast via a bonded channel having a center frequency of 5270 MHz and the second transmission unit 240-2 transmits the same broadcast via the channel having a center frequency of 2417 MHz.

Again, in FIG. 2, the transmission control unit 250 controls the overall operation of the STB 200. In particular, the transmission control unit 250 controls the broadcast received through the broadcast reception unit 210 to be transmitted to the DTV 300 via one of the channels in the 5 GHz band and one of the channels in the 2.4 GHz band.

In addition, the transmission control unit 250 determines whether interference by radar is sensed in the channel in the 5 GHz band by which the broadcast is transmitted to the DTV 300.

In general, there are use restrictions by the DFS regulation in the channels in the 5 GHz band. The DFS is a regulation for allocating use permission to some channels in the 5 GHz band according to priority by radar.

The channels to which the DFS is applied are channels having center frequencies of 5260 MHz, 5280 MHz, 5300 MHz, 5320 MHz, 5500 MHz, 5520 MHz, 5540 MHz, 5560 MHz, 5580 MHz, 5660 MHz, 5680 MHz, and 5700 MHz.

Accordingly, if interference by radar is sensed, devices using these channels must empty these channels within a predetermined period of time and cannot use these channels for a predetermined period of time.

The transmission control unit 250 determines whether interference by radar as defined by the DFS regulation is sensed, and controls the first transmission unit 240-1 not to transmit the encrypted broadcast if interference is sensed.

For example, it is assumed that channels having center frequencies of 5260 MHz and 5280 MHz in the 5 GHz are available and a channel having a center frequency of 2417 MHz in the 2.4 GHz is available. If interference by radar is sensed in the channels having center frequencies of 5260 MHz and 5280 MHz, the first transmission unit 240-1 stops transmitting a broadcast via a bonded channel having a center frequency of 5270 MHz and the second transmission unit 240-2 keeps transmitting the same broadcast via the channel having a center frequency of 2417 MHz.

The transmission control unit 250 determines if the predetermined time during which use is restricted by interference by radar as defined by the DFS regulation has passed, and thereby decides whether the first transmission unit 240-1 restores transmission of the broadcast. In addition, the transmission control unit 250 determines if there are any available channels in the 5 GHz band which are not related to interference by radar as defined by the DFS regulation.

If there are any available channels in the 5 GHz band which are not related to interference by radar as defined by the the DFS regulation, the transmission control unit 250 controls the first transmission unit 240-1 to restore transmission of the broadcast via one of the available channels.

For example, (1) if the predetermined time during which use of a bonded channel having a center frequency of 5270

MHz is restricted by interference by radar has passed, or (2) if there are any other available channels in the 5 GHz band, such as 5310 MHz, the transmission control unit 250 (1') restores transmission via the bonded channel having a center frequency of 5270 MHz, or (2') controls the first transmission unit 240-1 to start transmission via any other available channel in the 5 GHz band, such as 5310 MHz.

In the meantime, there are no use restrictions in accordance with the DFS regulation to the channels in the 2.4 GHz band.

Therefore, the transmission control unit 250 controls the second transmission unit 240-2 to keep transmitting the broadcast via a channel in 2.4 GHz, regardless of whether interference by radar as defined by the DFS regulation occurs in the channels of the 5 GHz band.

In this exemplary embodiment, the transmission unit 240 includes the two transmitters 240-1 and 240-2, but this is merely a simplified example for convenience of description. Accordingly, the transmission unit 240 may include three or more transmitters, and it is also possible that the three or more transmitters each wirelessly transmits a broadcast via different channels in different bands or in the same band.

As described above, the DTV 300 is a kind of a broadcast output apparatus which wirelessly receives a broadcast from the STB 200 and outputs it. The DTV 300 processes signals of the broadcast received from the STB 200 and provides the viewer with them.

As illustrated in FIG. 2, the DTV 300 according to an exemplary embodiment of the present invention includes a reception unit 310, a decryption unit 320, a multiplexer (MUX) 330, an image processing unit 340, a reception control unit 350, and an output unit 360.

The reception unit 310 wirelessly receives broadcasts from the transmission unit 240 of the STB 200. The reception unit 310 includes a first reception unit 310-1 which wirelessly receives broadcasts via channels in the 5 GHz band, and a second reception unit 310-2 which wirelessly receives broadcasts via channels in the 2.4 GHz band.

That is, the first reception unit 310-1 of the DTV 300 wirelessly receives a HD quality of broadcasts from the first transmission unit 240-1 of the STB 200 via a channel in the 5 GHz band, and the second reception unit 310-2 of the DTV 300 wirelessly receives a SD quality of broadcasts from the second transmission unit 240-2 of the STB 200 via a channel in the 2.4 GHz band.

The first reception unit 310-1 and the second reception unit 310-2 provide the decryption unit 320 with the received broadcasts.

The decoding unit 320 receives the encrypted broadcast from the first reception unit 310-1 and the second reception unit 310-2, decrypts the broadcasts, and outputs the decrypted broadcast to the MUX 330.

The MUX 330 selects one of the decrypted broadcasts, which were received through the first reception unit 310-1 and the second reception unit 310-2. Which broadcast is selected is determined according to control of the reception control unit 350. The MUX 330 outputs the selected broadcast to the image processing unit 340.

The image processing unit 340 performs image signal processing of the selected broadcast, such as color signal processing and image enhancement processing. The image processing unit 340 outputs the processed broadcast to the output unit 360, and the output unit 360 displays the images on a display.

The reception control unit 350 controls the overall operation of the DTV 300. In particular, the reception control unit 350 controls the MUX 330 to select one of the broadcasts received through the first reception unit 310-1 and the second reception unit 310-2. Selecting which receiver a broadcast is received through depends on whether interference by radar is sensed.

In more detail, the reception control unit 350 determines whether interference by radar is sensed in a channel in the 5 GHz band for receiving a broadcast through the first reception unit 310-1.

As described above, since there are use restrictions by the DFS regulation in the channels of the 5 GHz band, the reception control unit 350 determines whether interference by radar is sensed. If there are no use restrictions by the DFS regulation in the channel in the 5 GHz band, the reception control unit 350 controls the MUX 330 to select the HD quality of the broadcast received through the first reception unit 310-1.

Alternatively, if there are use restrictions by the DFS regulation in the channel in the 5 GHz band, the reception control unit 350 controls the MUX 330 to select the broadcast received through the second reception unit 310-2.

While controlling the MUX 330 to select the broadcast received through the second reception unit 310-2, if the reception control unit 350 determines that a broadcast is received via a channel in the 5 GHz band where interference is not sensed, the reception control unit 350 controls the MUX 330 to select the broadcast received via the channel in the 5 GHz band where interference is not sensed.

In addition, if a broadcast is not received through one of the first reception unit 310-1 and the second reception unit 310-2, the reception control unit 350 may control the MUX 330 to select one of the first reception unit 310-1 and the second reception unit 310-2 which receives the broadcast.

In this exemplary embodiment, the reception unit 310 includes the two receivers 310-1 and 310-2, but this is merely a simplified example for convenience of description. Accordingly, the reception unit 310 may include three or more receivers, and it is also possible that the three or more receivers each wirelessly receive a broadcast via different channels in different bands or in the same band.

The number of receivers does not need to be identical to the number of transmitters, and the technical idea of the present invention can be applied even when the number of receivers is different from the number of transmitters.

Figure 4:
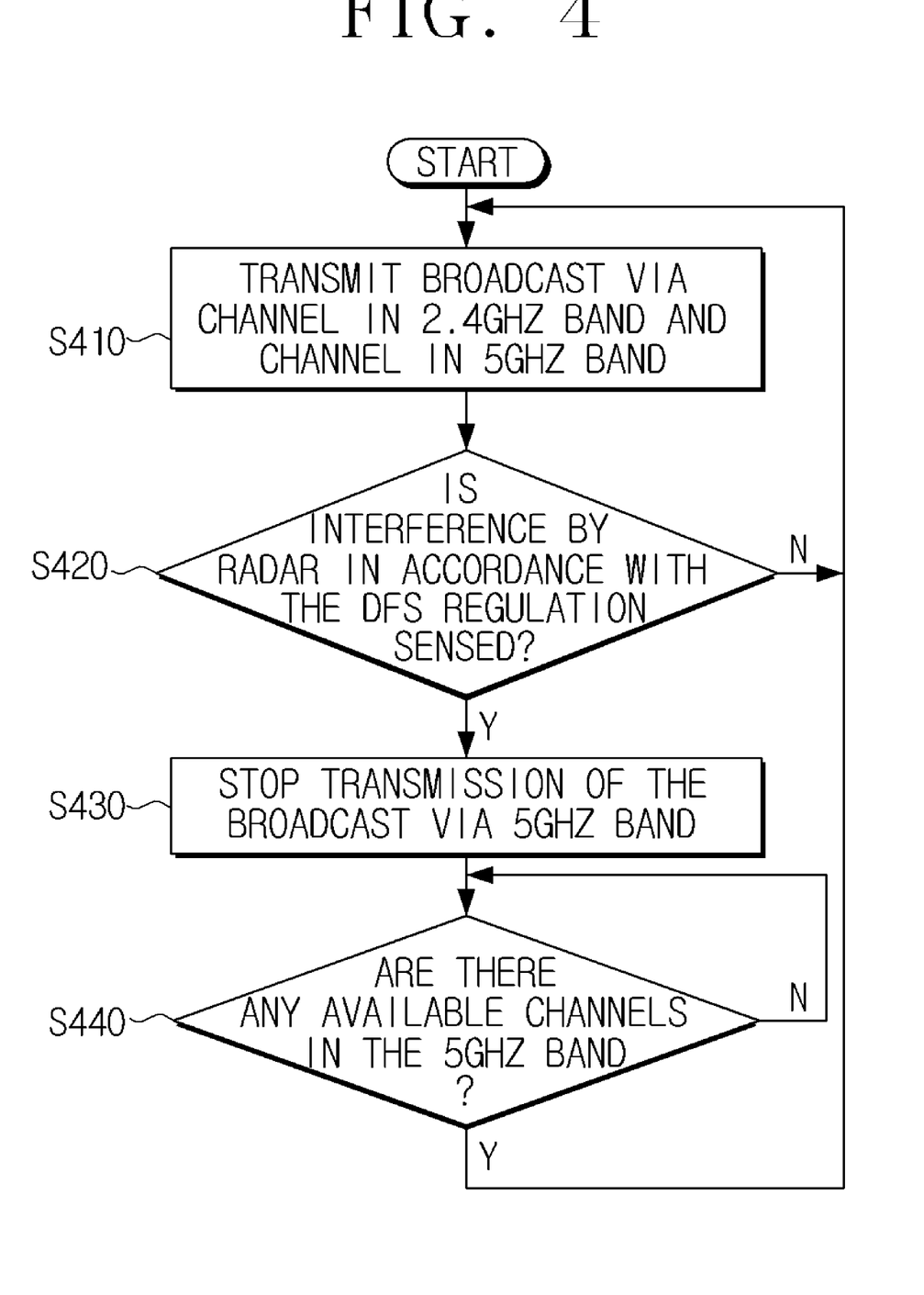
FIG. 4 is a flow chart illustrating a broadcast transmission method according to the exemplary embodiment of the present invention.

FIG. 4 is a flow chart illustrating a broadcast transmission method according to the exemplary embodiment of the present invention. As illustrated in FIG. 4, the transmission control unit 250 controls the first transmission unit 240-1 to transmit a broadcast via the 5 GHz band, and controls the second transmission unit 240-2 to transmit a broadcast via the 2.4 GHz band. Accordingly, the first transmission unit 240-1 wirelessly transmits the broadcast via one of the channels in the 5 GHz band, and the second transmission unit 240-2 wirelessly transmits the broadcast via one of the channels in the 2.4 GHz band (S410).

The transmission control unit 250 determines whether interference by radar as defined by the DFS regulation is sensed (S420). If interference by radar as defined as the DFS regulation is sensed (S420-Y), the transmission control unit 250 controls the first transmission unit 240-1 to stop wireless transmission of the broadcast via the 5 GHz band (S430). Consequently, wireless transmission of the broadcast by the first transmission unit 240-1 is interrupted and only transmission of the broadcast by the second transmission unit 240-2 is continued.

Subsequently, the transmission control unit 250 determines whether there are any available channels in the 5 GHz band (S440). If there are any available channels in the 5 GHz band, the transmission control unit 250 controls the first transmission unit 240-1 to wirelessly transmit the broadcast via the available channel. As a result, the first transmission unit 240-1 wirelessly transmits the broadcast via one of the channels in the 5 GHz band, and the second transmission unit 240-2 wirelessly transmits the broadcast via one of the channels in the 2.4 GHz band (S410).

Hence, broadcasts can be provided to the viewers without data interruption by radar interference as defined by the DFS regulation, and the HD quality of broadcasts can be provided at the same time.

Figure 5:
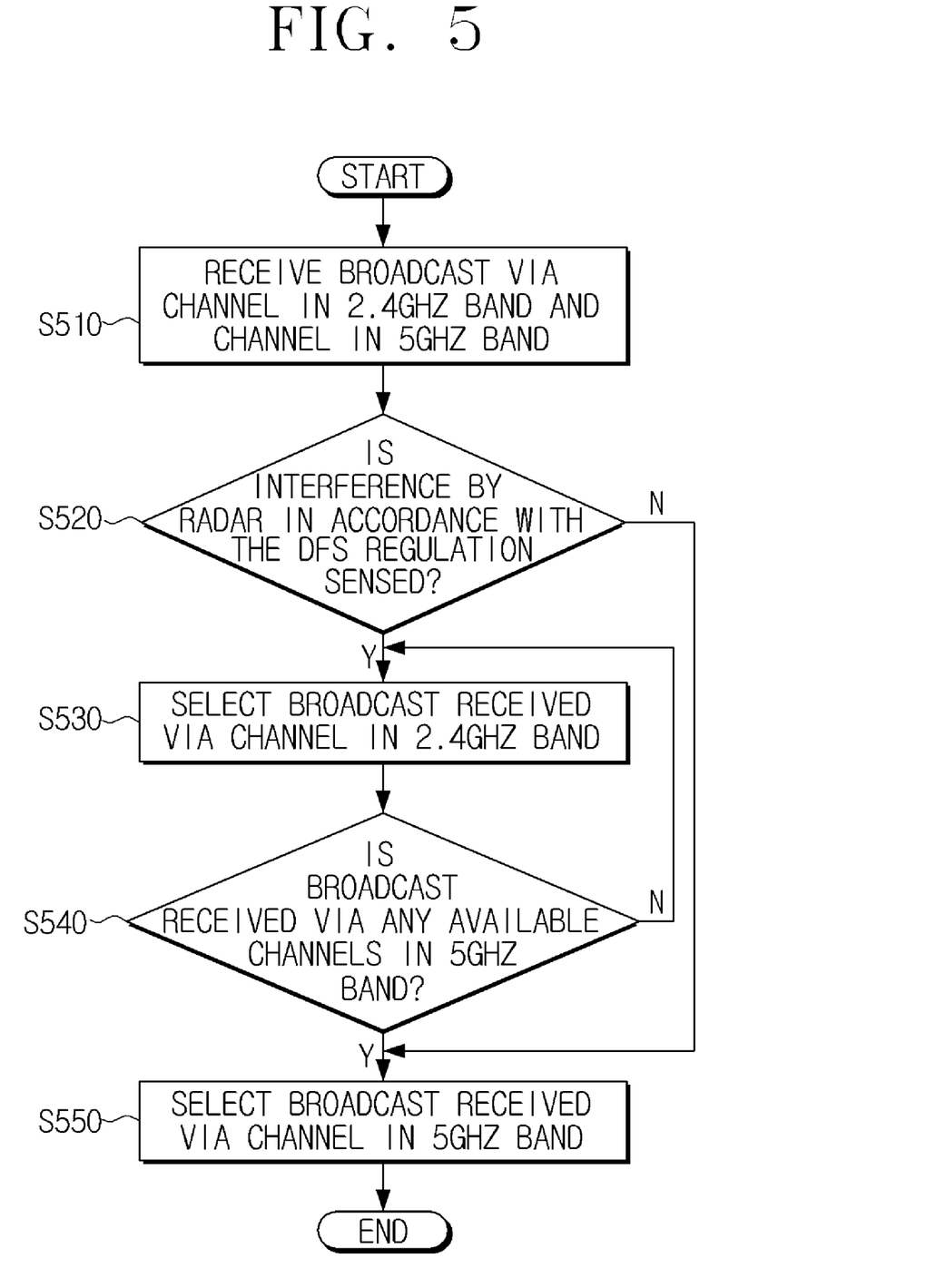
FIG. 5 is a flow chart illustrating a broadcast reception method according to the exemplary embodiment of the present invention.

FIG. 5 is a flow chart illustrating a broadcast reception method according to the exemplary embodiment of the present invention. As illustrated in FIG. 5, the reception control unit 350 controls the first reception unit 310-1 to receive a broadcast via the 5 GHz band, and controls the second reception unit 310-2 to receive a broadcast via the 2.4 GHz band. Accordingly, the first reception unit 310-1 wirelessly receives the broadcast via one of the channels in the 5 GHz band, and the second reception unit 310-2 wirelessly receives the broadcast via one of the channels in the 2.4 GHz band (S510).

The reception control unit 350 determines whether interference by radar as defined by the DFS regulation is sensed (S520).

If interference by radar as defined by the DFS regulation (S520-N) is not sensed, the reception control unit 350 controls the MUX 330 to select the broadcast which is wirelessly transmitted via the channel in the 5 GHz band (S550) so that the user can view the HD quality of the broadcast which is wirelessly transmitted via the channel in the 5 GHz band.

If interference by radar as defined by the DFS regulation is sensed (S520-Y), the reception control unit 350 controls the MUX 330 to select the broadcast which is wirelessly transmitted via the channel in the 2.4 GHz band (S530) so that the user can view the SD quality of the broadcast which is wirelessly transmitted via the channel in the 2.4 GHz band.

Subsequently, the reception control unit 350 determines whether a broadcast is received via any available channels in the 5 GHz band (S540). The reception control unit 350 controls the MUX 330 to select the broadcast which is wirelessly transmitted via the channel in the 2.4 GHz band until a broadcast is wirelessly received via any available channels in the 5 GHz band.

If a broadcast is wirelessly received via any available channels in the 5 GHz band (S540-Y), the reception control unit 350 controls the MUX 330 to select the broadcast which is received wirelessly via any available channels in the 5 GHz band. Consequently, the MUX 330 selects the HD quality of the broadcast which is received wirelessly via any available channels in the 5 GHz band so that the DTV 300 provides the viewer with the selected HD quality of the broadcast.

Figure 6A:
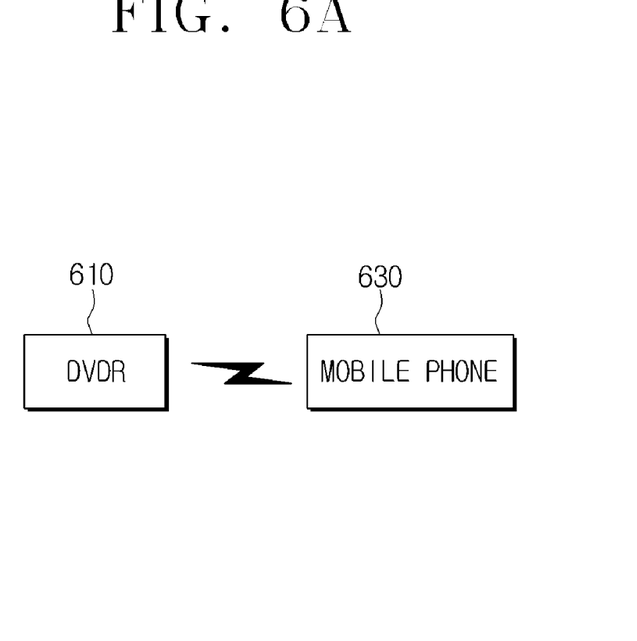
FIGS. 6A and 6B illustrate a transmission system according to a second embodiment of the present invention.
Figure 6B:
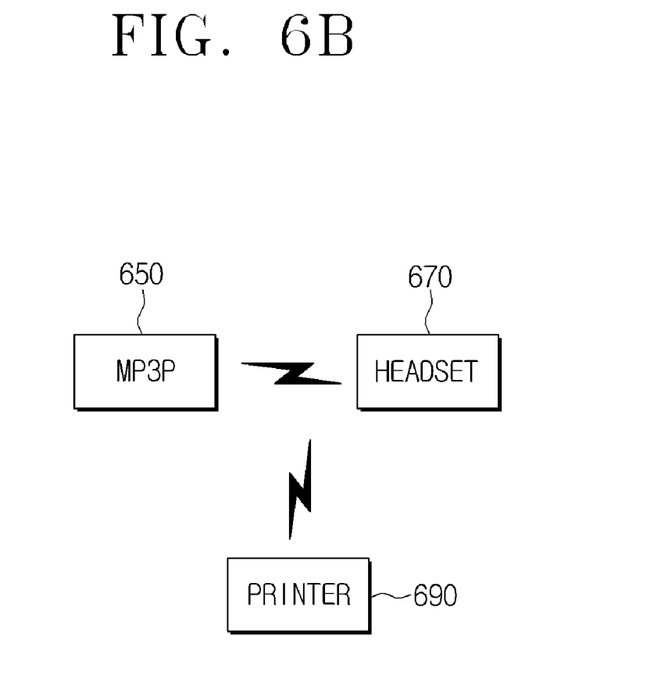

In the above exemplary embodiment of the present invention, the STB 200 to transmit broadcasts is an example of the transmission apparatus, and the DTV 300 to output images is an example of the reception apparatus, but this is merely an exemplary embodiment for convenience of description. The technical idea of the present invention can be applied even when different kinds of transmission apparatus or reception apparatus are used. FIGS. 6A and 6B illustrate a transmission system according to a second embodiment of the present invention.

FIG. 6A illustrates that the technical idea of the present invention can be applied even in a case when broadcasts are not transmitted or received, and FIG. 6B illustrates that the technical idea of the present invention can be applied even in the case of interference as defined by regulations other than the DFS or interference by conflicts with other devices occurs.

Referring to FIG. 6A, the digital versatile disk recorder (DVDR) 610 wirelessly transmits images via a channel in the 5 GHz band, and wirelessly transmits the same images via a channel in the 2.4 GHz band. The mobile phone 630 sets the channel in the 5 GHz bands to be a default channel, and displays images received via the channel in the 5 GHz band.

If interference by radar as defined by the DFS regulation is sensed, the DVDR 610 stops transmitting images via the channel in the 5 GHz band, and the mobile phone 630 receives and displays images via the channel in the 2.4 GHz band.

Therefore, the HD quality of images can be provided to the viewers without data interruption.

Referring to FIG. 6B, the MP3 player 650 wirelessly transmits audio via a channel in a first band, and wirelessly transmits the same audio via a channel in a second band. The headset 670 sets the channel in the first band to be a default channel, and outputs audio received via the channel in the first band.

If interference due to conflict with a printer 690 is sensed in the channel in the first band, the MP3 player 650 stops transmitting audio via the channel in the first band, and the headset 670 outputs the audio received via the channel in the second band.

Audio can thereby be provided to the user without interruption.

Figure 7:
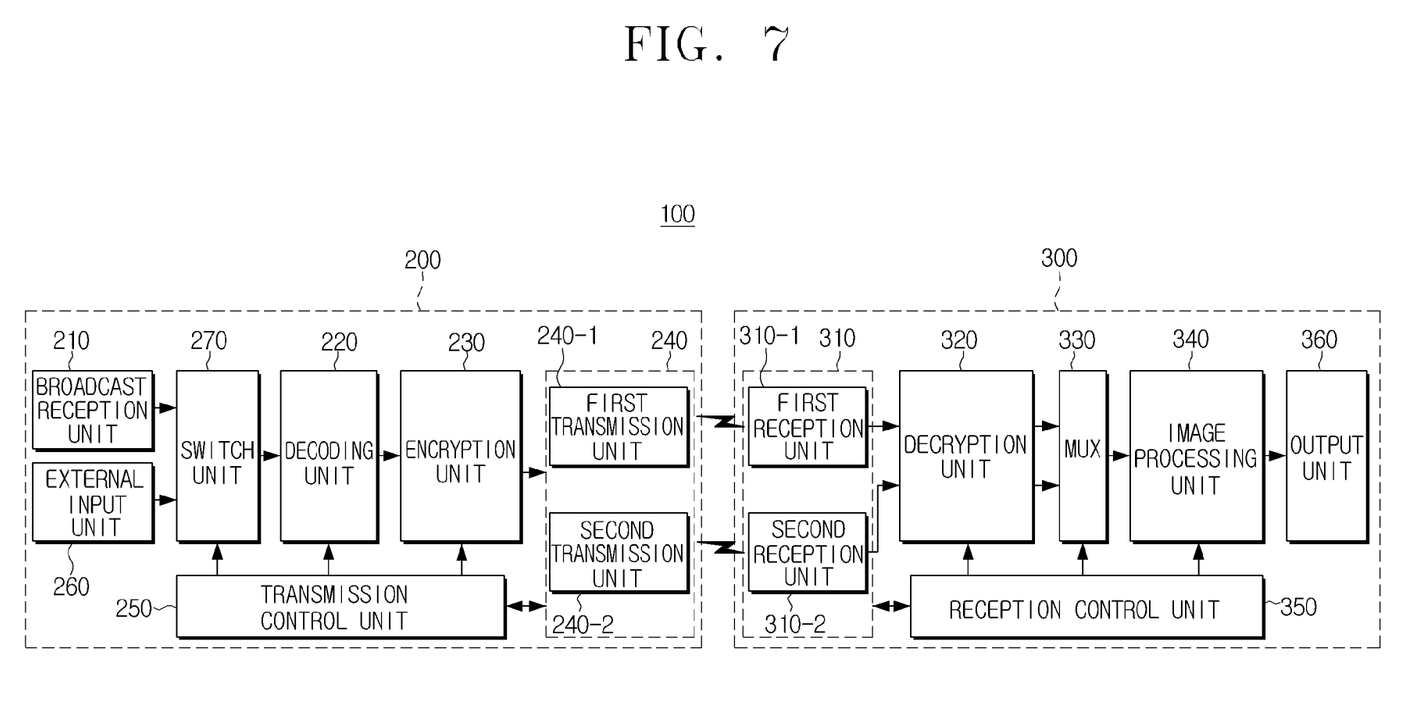
FIG. 7 illustrates a transmission system which selects and transmits one of a broadcast received from a broadcast station and an externally input image.

The technical idea of the present invention can be applied even when one of data provided from two or more sources is selected and transmitted. FIG. 7 illustrates a transmission system which selects and transmits one of a broadcast received from a broadcast station and an externally input image.

A broadcast reception unit 210, a decoding unit 220, an encryption unit, 230 and the transmission unit 240 of the STB 200 in FIG. 7 are operated in the same way as those of the STB 200 in FIG. 2, and can be inferred from those of the STB 200 in FIG. 2, so detailed description is not repeated here. A DTV 300 in FIG. 7 are operated in the same way as that in FIG. 2, and can be inferred from that of the STB 200 in FIG. 2, so detailed description is not repeated here.

Accordingly, description of an external input unit 260 and a switch unit 270 is given here.

The external input unit 260 receives image signals from external devices which are connected thereto. The external input unit 260 includes a plurality of external input terminals, through which diverse types of external devices are connected to the external input unit 260.

The external input terminals of the external input unit 260 may be composite input terminals, component input terminals, S-video input terminals, or High Definition Multimedia Interface (HDMI) input terminals.

The switch unit 270 performs switching so that one of signals output by the broadcast reception unit 210 and signals output by the external input unit 260 can be transmitted to the decoding unit 140.

The transmission control unit 250 controls the switch unit 270 to select one of the broadcast received from the broadcast station and the externally input image.

As described above, the technical idea of the present invention can be applied even when one of data provided from two or more sources is selected and transmitted. Consequently, broadcasts or images can be selectively provided to the user without data interruption by interference.

In the above exemplary embodiments of the present invention, the transmission control unit 250 and the reception control unit 350 sense interference by radar as defined by the DFS regulation, but these are merely exemplary embodiments for convenience of description. The technical idea of the present invention can be applied even when the first transmission unit 240-1, the second transmission unit 240-2, the first reception unit 310-1, and the second reception unit 310-2 each sense interference by radar as defined by the DFS regulation.

For example, the first transmission unit 240-1 determines whether interference by radar as defined by the DFS regulation is sensed, and stops transmission via a channel in the 5 GHz band if interference by radar as defined by the DFS regulation is sensed. Regardless of whether interference by radar as defined by the DFS regulation is sensed, the second transmission unit 240-2 keeps transmission via a channel in the 2.4 GHz band.

Furthermore, the first reception unit 310-1 determines whether interference by radar as defined by the DFS regulation is sensed, and if interference by radar as defined by the DFS regulation is sensed, the first reception unit 310-1 reports it to the reception control unit 350. Subsequent to the report, the reception control unit 350 controls the MUX 330 to select a broadcast received through the second reception unit 310-2. In this case, the technical idea of the present invention can be applied.

In the above exemplary embodiments of the present invention, the MUX 330 selects one of the broadcasts decrypted by the decryption unit 320, but this is merely an example. The technical idea of the present invention can be applied even when the MUX 330 selects one of the broadcasts received by the first reception unit 310-1 and the broadcasts received by the second reception unit 310-2, and the decryption unit 320 decrypts only the selected broadcast.

In the above exemplary embodiments of the present invention, a broadcast is encrypted and transmitted directly by the transmission unit 240, but it may be possible that a broadcast is encrypted, encoded, and transmitted by the transmission unit 240. In this case, the broadcast received through the reception unit 310 must necessarily be decompressed by decoding and decrypted.

As can be appreciated from the above description, data can be transmitted and received continuously even when interference occurs due to conflicts between devices or regulation standards. Therefore, the users can provide the data without data interruption.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A reception apparatus, comprising:
a first reception unit which receives data via a channel in a first band;
a second reception unit which receives data via a channel in a second band; and
a reception control unit which determines whether interference is sensed and thereby controls selection of one of the data received via the channel in the first band and the data received via the channel in the second band.

2. The reception apparatus of claim 1, wherein the reception control unit controls selection of the data received via the channel in the first band if interference is not sensed in the channel in the first band, and
the reception control unit controls selection of the data received via the channel in the second band if interference is sensed in the channel in the first band.

3. The reception apparatus of claim 2, wherein if the reception control unit determines that data are received via a channel in the first band where interference is not sensed while selecting the data received via the channel in the second band, the reception control unit controls selection of the data received via the channel in the first band where the interference is not sensed.

4. The reception apparatus of claim 1, wherein if the data are not received through one of the first reception unit and the second reception unit, the reception control unit controls selection of the data received through the other one of the first reception unit and the second reception unit.

5. The reception apparatus of claim 1, wherein the reception control unit controls selection of the data received via the channel in the second band, if interference is sensed in the channel in the first band, regardless of whether interference is sensed in the channel in the second band.

6. The reception apparatus of claim 1, wherein the interference is at least one of an interference by radar as defined by dynamic frequency selection (DFS) regulation standard or an interference caused by a conflict with other devices.

7. The reception apparatus of claim 1, wherein the first band is a frequency band in accordance with IEEE 802.11n standard, and
the second band is a frequency band in accordance with IEEE 802.11g standard.

8. A reception method, comprising:
receiving data via a channel in a first band;
receiving data via a channel in a second band; and
determining whether interference is sensed and thereby selecting one of the data received via the channel in the first band and the data received via the channel in the second band.

9. The reception method of claim 8, wherein in the selecting operation, the data received via the channel in the first band are selected if interference is not sensed in the channel in the first band, and
the data received via the channel in the second band are selected if interference is sensed in the channel in the first band.

10. The reception method of claim 9, wherein in the selecting operation, if data are received via a channel in the first band where interference is not sensed, after selecting the data received via the channel in the second band, the data received via the channel in the first band where the interference is not sensed are selected.

11. The reception method of claim 8, wherein in the selecting operation, if the data are not received through one of the channel in the first band and the channel in the second band, the data received through the other one of the channel in the first band and the channel in the second band are selected.

12. The reception method of claim 8, wherein in the selecting operation, the data received via the channel in the second band are selected, if interference is sensed in the channel in the first band, regardless of whether interference is sensed in the channel in the second band.

* * * * *